Aug. 6, 1940. A. SIEVERS ET AL 2,210,219
HARVESTER ATTACHMENT
Filed Jan. 20, 1939   4 Sheets-Sheet 2
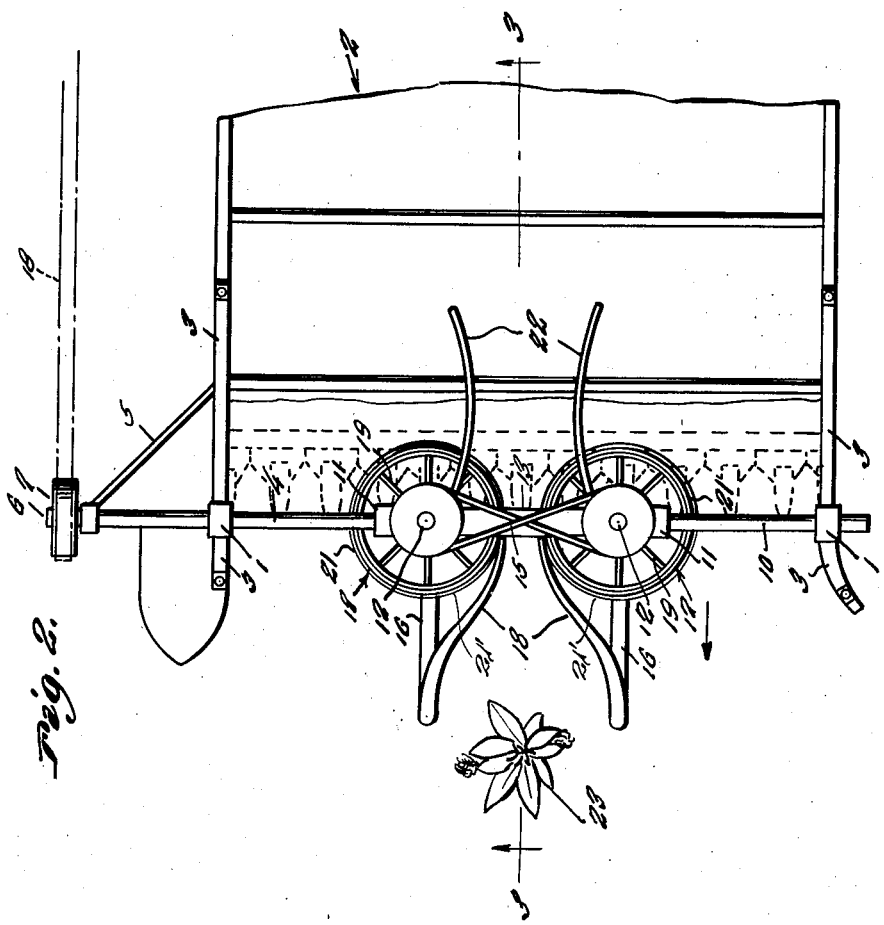
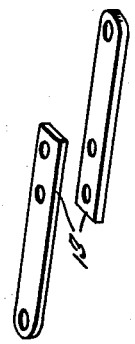
Inventors
A. Sievers
H. Sievers
By Clarence A. O'Brien
and Hyman Berman
Attorneys

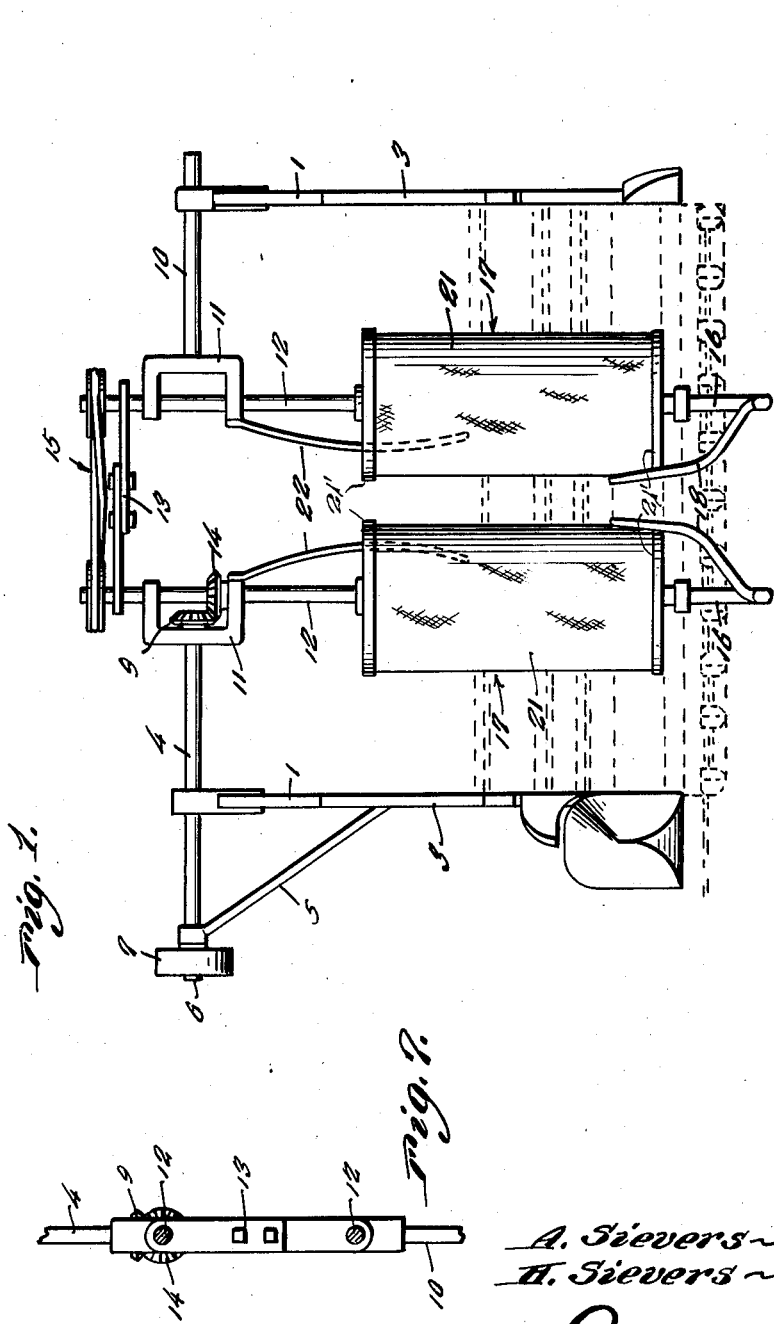

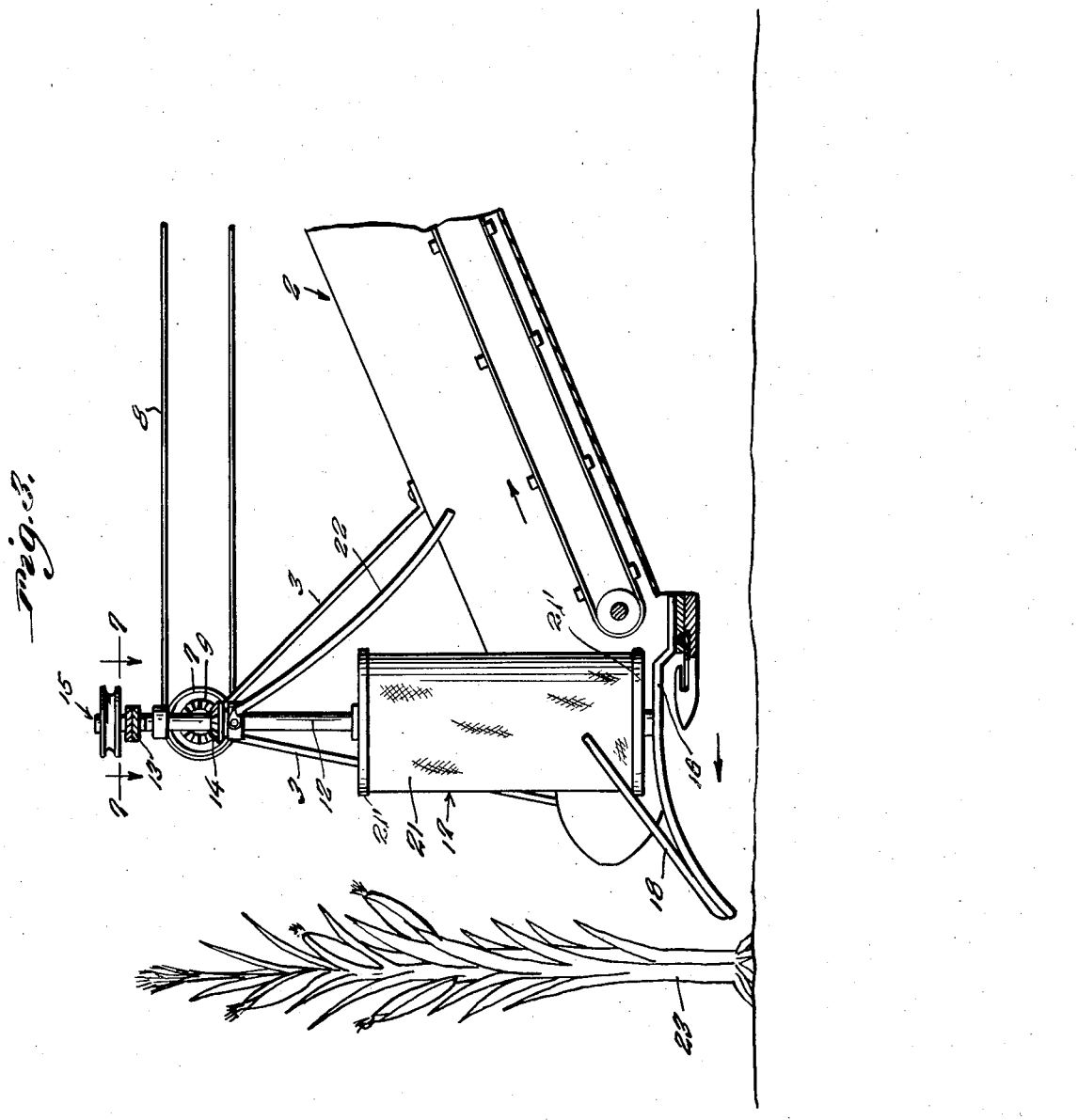

Aug. 6, 1940.  A. SIEVERS ET AL  2,210,219
HARVESTER ATTACHMENT
Filed Jan. 20, 1939  4 Sheets-Sheet 4
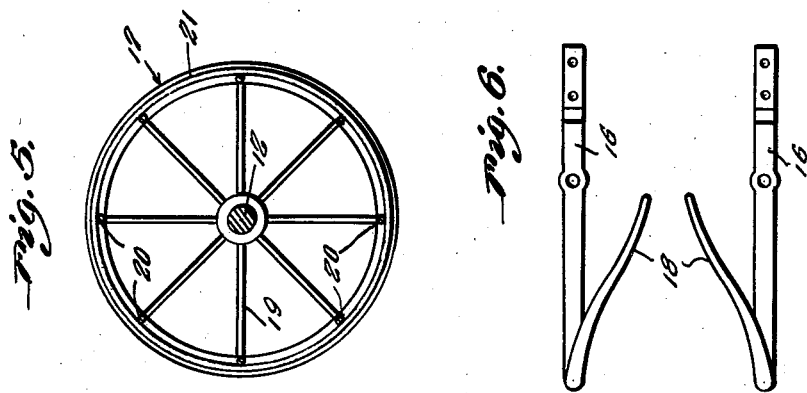
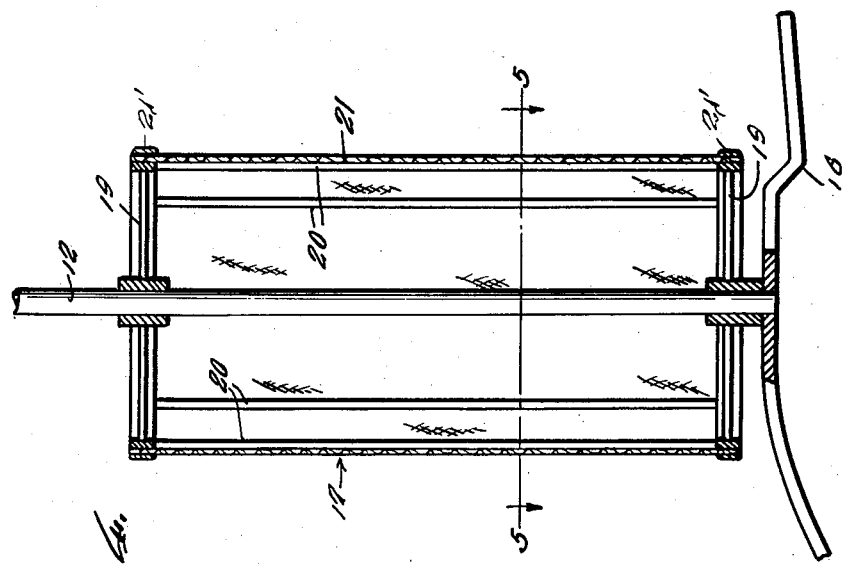
Inventors
A. Sievers
H. Sievers
By Clarence A. O'Brien
and Hyman Berman
Attorneys Patented Aug. 6, 1940

2,210,219

UNITED STATES PATENT OFFICE 2,210,219

HARVESTER ATTACHMENT

Albert Sievers and Henry Sievers, Meppen, Ill.

Application January 20, 1939, Serial No. 252,034

2 Claims. (Cl. 56—119)

The present invention relates to an attachment for all crop harvesters for use when harvesting corn and has for its primary object to provide, in a manner as hereinafter set forth, a device embodying novel means for holding the stalks or hills as they are cut and then discharging them on the usual platform of the machine.

Another very important object of the invention is to provide a novel construction and arrangement for mounting the attachment in position for operation on the platform of the harvester.

Other objects of the invention are to provide a harvester attachment of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of the device.

Figure 2 is a top plan view thereof, showing the device mounted on the forward end of the harvester platform.

Figure 3 is a view in vertical longitudinal section through the invention, taken substantially on the line 3—3 of Fig. 2.

Figure 4 is a view in vertical section through one of the vertical rolls.

Figure 5 is a view in horizontal section, taken substantially on the line 5—5 of Fig. 4.

Figure 6 is a top plan view of the lower guides which direct the corn stalks between the pair of rolls.

Figure 7 is a view in horizontal section, taken substantially on the line 7—7 of Fig. 3.

Figure 8 is a perspective view of the elements which form a brace extending between the upper end portions of the roll shafts.

Referring now to the drawings in detail, it will be seen that the embodiment of the invention which has been illustrated comprises a pair of posts 1 which are mounted on the forward end portion of the harvester platform 2 at the sides thereof. Braces 3 are provided for the posts 1. Mounted transversely on the upper end of the inner post 1 is a tubular housing 4 for which a brace 5 is provided. It will be observed that the tubular housing 4 is mounted at an intermediate point on its respective post 1. Rotatably mounted in the tubular housing 4 is a shaft 6 having fixed on one end portion thereof a pulley 7. An endless belt 8 is trained over the pulley 7 for driving the shaft 6 from the harvester (not shown). Fixed on the other end of the shaft 6 is a beveled gear 9. Mounted horizontally on the upper end of the outer post 1 is an arm 10.

The members 4 and 10 have fixed on their inner ends substantially U-shaped brackets 11 constituting bearings in which the upper portions of a pair of vertical shafts 12 are journalled. The shafts 12 extend above the brackets 11 and extending therebetween is a brace 13. A beveled gear 14 on one of the shafts 12 is driven by the gear 9. The shafts 12 are operatively connected for rotation in unison by a crossed belt and pulley connection 15 on the upper end portions of said shafts.

Secured beneath the forward end portion of the apron 2 and projecting forwardly therefrom is a pair of metallic bars 16 of suitable metal. As illustrated to advantage in Fig. 4 of the drawings, the lower end portions of the vertical shafts 12 are journalled in the bars 16. Fixed on each of the shafts 12 for rotation therewith is a roll which is designated generally by the reference numeral 17. The rolls 17 are spaced from each other for the passage of the corn stalks therebetween and said rolls are driven in opposite directions through the medium of the crossed belt and pulley connection 15. Extending rearwardly, inwardly and upwardly toward the space between the rolls 17 from the forward ends of the bars 16 is a pair of guides 18.

Referring to Figs. 4 and 5 of the drawings, it will be seen that in the embodiment which has been shown, each roll 17 comprises a frame structure including what may be referred to as vertically spaced upper and lower wheels 19 fixed on the shaft 12. Extending between the vertically spaced wheels 19 are rods 20. The frame formed by the members 19 and 20 has mounted thereon a cylindrical canvas cover 21. The cover can be attached to the frame in any suitable manner such as by the hoops 21' at the upper and lower ends of each roll. Guides 22 extend rearwardly and downwardly over the harvester platform 2 for directing the corn stalks straight back on said platform after they have been cut and leave the rolls 17.

It is thought that the operation of the device will be readily apparent from a consideration of the foregoing. Briefly, the corn stalks are directed between the spaced, vertical canvas rolls 17 by the lower guides 18. These guides are adapted to straighten up leaning stalks. Of course, the rolls 17 are rotating as the machine travels over the ground. The coacting canvas rolls 17 are adapted to firmly hold the stalks of corn as they are cut and then throw them rearwardly onto the harvester platform 2. In Figs. 2 and 3 of the drawings, the reference numeral 23 designates a hill of corn which the machine is approaching.

It is believed that the many advantages of a harvester attachment constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In a corn harvester including cutting means, a pair of vertically arranged elongated rolls supported above the cutting means and having smooth unobstructed circumferences, said rolls being but slightly spaced apart to grip stalks of corn between them as the stalks are being cut and means for rotating the rolls in opposite direction to cause the stalks to pass between the rolls, each roll being formed of a circular frame and a fabric covering for the frame which forms the circumference of the roll.

2. In a corn harvesting machine comprising a platform and cutting means at the forward edge of the platform, posts supported at the side edges of the platform, forwardly and downwardly curved bars connected with the platform adjacent the middle thereof and slightly spaced apart, vertically arranged shafts having their lower ends supported by said bars over the cutting means, means at the upper ends of the posts for supporting the shafts, an elongated vertically arranged roll carried by each shaft and each roll having a smooth uninterrupted circumference, the rolls being but slightly spaced apart to grip corn stalks as the stalks are being cut by the cutting means, means carried by the front ends of the bars for guiding the stalks between the rolls, means for rotating the rolls in opposite directions.

ALBERT SIEVERS.
HENRY SIEVERS.